United States Patent [19]
Wangsness

[11] Patent Number: 5,161,448
[45] Date of Patent: Nov. 10, 1992

[54] BALE SAW

[76] Inventor: Mark H. Wangsness, HCR4 Box 15, Miller, S. Dak. 57362

[21] Appl. No.: 685,917

[22] Filed: Apr. 16, 1991

[51] Int. Cl.5 .......................................... B23D 57/02
[52] U.S. Cl. ...................................... 83/795; 83/928; 30/379.5
[58] Field of Search ................. 83/788, 928, 795, 574; 30/379.5, 379; 144/34 F, 34 R, 3 D; 37/117.5, DIG. 3, DIG. 12; 241/101 A, 101.7

[56] References Cited

U.S. PATENT DOCUMENTS

| | | | |
|---|---|---|---|
| 2,746,492 | 5/1956 | DeHardit | 30/379.5 X |
| 3,078,886 | 2/1963 | Childress | 83/795 X |
| 3,612,127 | 11/1969 | Benno | 83/808 |
| 3,618,649 | 11/1971 | Benno | 83/808 |
| 3,796,242 | 3/1974 | Albright | 83/928 X |
| 4,073,532 | 2/1978 | Blair | 294/107 |
| 4,242,035 | 12/1980 | Hornstein | 37/117.5 X |
| 4,497,163 | 2/1985 | Ogman | 56/341 |
| 4,549,481 | 10/1985 | Groeneveld et al. | 100/98 |
| 4,579,052 | 5/1986 | Schaible | 100/5 |
| 4,640,170 | 2/1987 | Bakken | 83/795 X |
| 4,771,670 | 9/1988 | Woerman | 83/795 X |
| 4,779,503 | 10/1988 | Mitchell | 83/788 X |
| 4,813,164 | 3/1989 | Morrell | 37/117.5 |
| 4,903,562 | 2/1990 | Wunder et al. | 83/833 |

Primary Examiner—Frank T. Yost
Assistant Examiner—Clark F. Dexter
Attorney, Agent, or Firm—Hugh D. Jaeger

[57] ABSTRACT

A bale saw for cutting up large, cylindrical hay bales including a frame for quick mounting on a tractor load bucket. The frame includes a cross member and rearwardly projecting upper and lower structures which slidably mount over the bottom of the load bucket. A top member on the frame bolts to the top of the load bucket. Cable winches further strap the frame to the load bucket. A hydraulic motor, powered by the tractor hydraulic system, rotates a chain saw mounted on the frame. The tractor is driven up to a large hay bale, and the bucket may be adjusted to any height to cut the bale into pieces small enough for easy handling.

1 Claim, 3 Drawing Sheets

BALE SAW

BACKGROUND OF THE INVENTION

1. Field of the Invention

This present invention is a bale saw for cutting hay or straw bales, and more particularly, for cutting large, round hay bales The hay bales are cut for feeding to animals.

2. Background of the Invention

The baling of hay for animal food has changed from the compaction of smaller, rectangular bales to the rolling of large, round cylinders. There are many advantages inherent in this technique. The bales are wound in a circular fashion so that they, in effect, provide their own thatched surface for deflecting precipitation. This allows storage of the round bales in fields, rather than requiring barn loft storage.

The round bales are large and difficult to handle, however. A typical bale may weigh 1,200 pounds. Obviously, the bales cannot be individually picked up and thrown into grinders as could the smaller, rectangular bales. When the large bales are to be cut up for animal food, mechanical assistance is needed to manipulate the bales and reduce them to edible size.

The use of chain saws for cutting bales in the prior art is illustrated by U.S. Pat. No. 4,903,562 to Wunder et al. The Wunder et al. patent discloses a particular style of cutting link used on hay bales. The use of such chains in grinding apparatus is illustrated by U.S. Pat. No. 3,612,127 and U.S. Pat. No. 3,618,649, both to Benno, which show hoppers with multiple chains for grinding.

While the grinding of bales is known in the art, what is not illustrated in this art is the reduction in size of a large bale so that it can be easily handled and fed to prior art grinders or even fed to animals.

Various apparatus have been disclosed for slicing and manipulating large bales. For example, U.S. Pat. No 4,497,163 to Ogman and U.S. Pat. No. 4,549,481 to Groeneveld et al. illustrate methods of slicing cylindrical bales by unrolling them. In the normal farm operation, this highly specialized apparatus is not always satisfactory. What is needed is a mobile, easily handled bale saw for cutting bales down to smaller sizes so that they can be handled by farmers and standard farm equipment. Then any of the various grinding techniques may be used to reduce the bales to animal feed.

The present invention overcomes the difficulties of the prior art by providing a bale saw for large round hay bales.

SUMMARY OF THE INVENTION

The general purpose of the present invention is a bale saw constructed according to the present invention, and which includes a frame for quick removable mounting to powered equipment, such as a tractor load bucket. The bale saw includes a frame for mounting on the load bucket, a chain bar mounted on the frame extending away from the bucket, and a cutting chain mounted for continuous movement around the chain bar.

The frame of the bale saw constructed according to the present invention preferably includes upper and lower frame beams for slipping over the lip of the lower wall of the load bucket, and structure for removably attaching a top member to the top of the load bucket. The bale saw preferably is hydraulically powered from the tractor hydraulic system.

The bale saw constructed according to the present invention is attached to a tractor load bucket. The tractor is then driven in the field to each of the round bales to be cut. The bale saw height is adjusted easily by adjusting the height of the load bucket on the tractor. Therefore, the present invention can cut bales at any height. Unlike the prior art devices requiring that a bale be dropped into a hopper, and be ground or sliced on expensive, specialized equipment, the present invention first reduces the large bales to sizes that can be easily handled by hand or standard farm equipment.

One significant aspect and feature of the present invention is a bale saw which can be mounted onto any bucket of a tractor or any other bucket type vehicle so long as the vehicle can provide hydraulic power to the bale saw.

Having thus described embodiments of the present invention, it is a principal object hereof to provide a bale saw for cutting of hay bales, especially large, round, rolled hay bales.

One object of the present invention is a bale saw for use on a bucket of a vehicle, such as a farm tractor, and is rapidly interchangeable between the buckets of the farm equipment or bucket type of vehicles.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
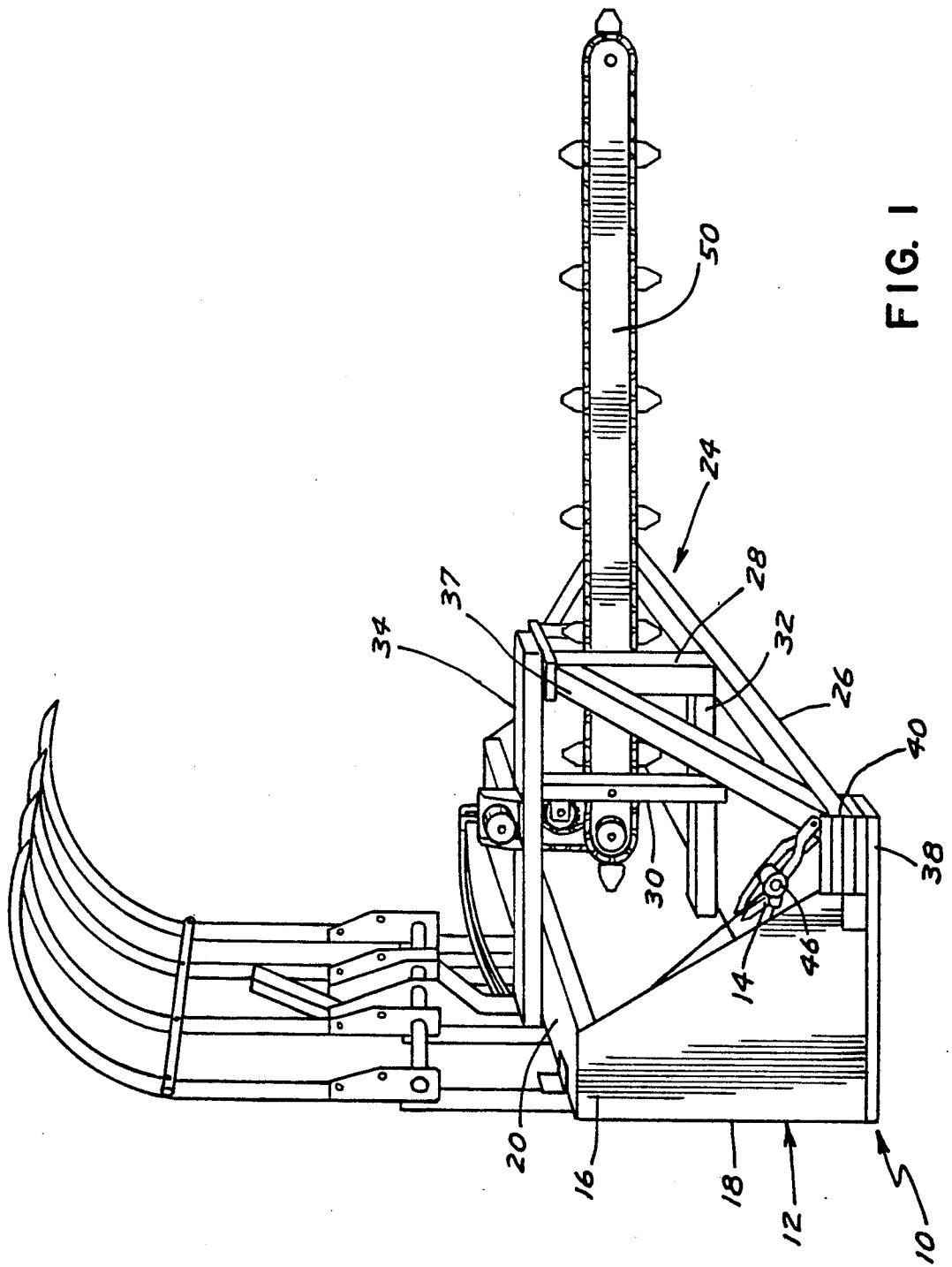
FIG. 1 is a perspective view of a bale saw constructed according to the present invention mounted on a tractor load bucket.

A bale saw 10 is constructed according to the present invention and is shown mounted on a bucket 12 of a tractor. The tractor bucket 12 includes a bottom 14, side walls 16, a back 18, and a top 20.

The bale saw 10 includes a frame 24 constructed of welded tubular steel having a rectangular cross section. A cross member 26 forms the base of frame 24, and is aligned parallel to the front edge of bottom 14. A pair of vertical forward standards 28 is mounted upwardly projecting from cross member 26, preferably by welding, as are all other connections of the frame 24. A corresponding pair of rear vertical standards 30 is mounted on a lower frame member 32. Lower frame member 32 has a forward end welded to cross member 26.

A top frame member 34 is mounted rearwardly across the tops of forward vertical standards 28 and rear vertical standards 30. A top frame member 34 extends rearward and is removably attached to the top 20 of the tractor bucket 12, preferably by welding or by a bolt 36.

Figure 2:
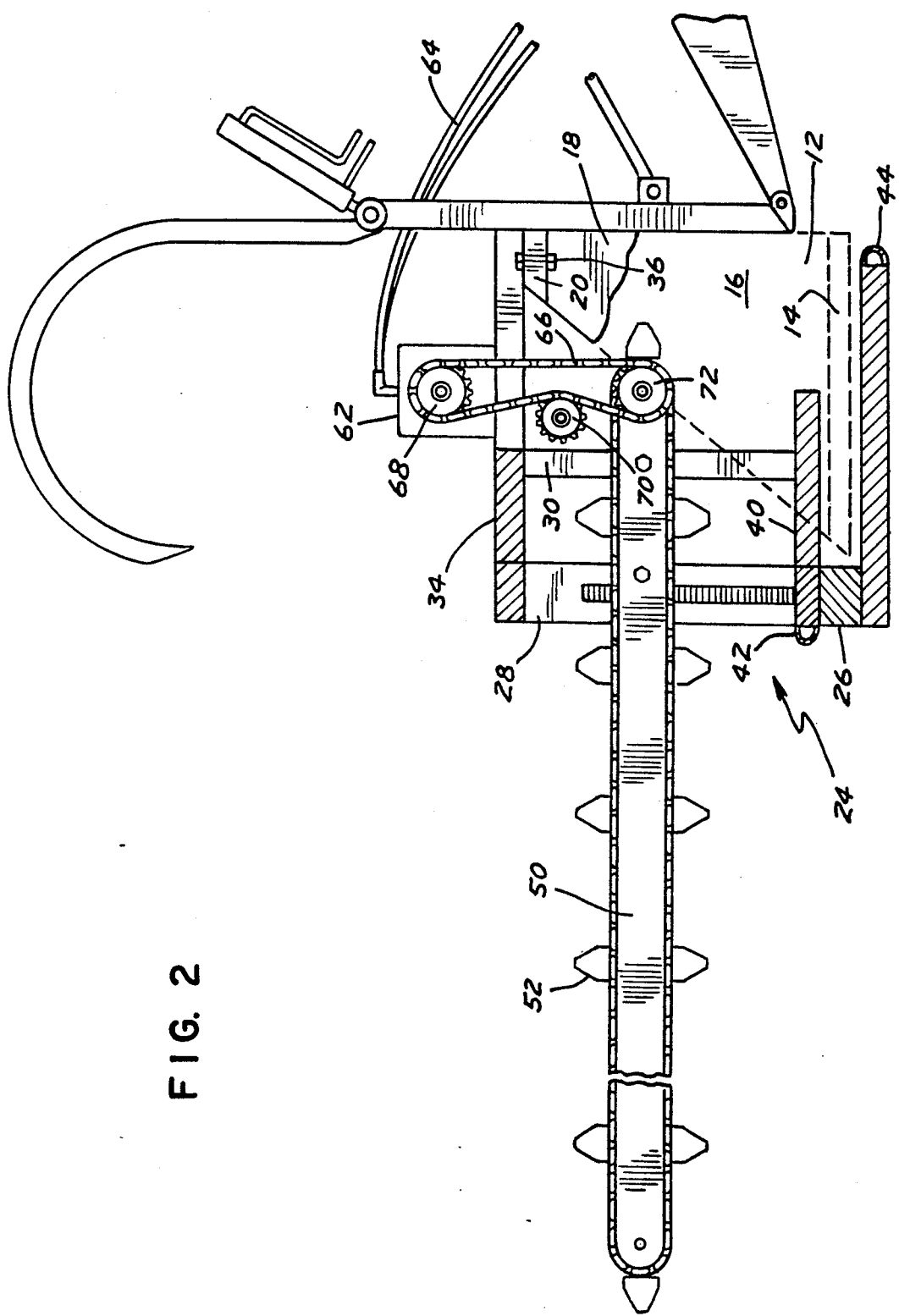
FIG. 2 is a cross-sectional view of the bale saw of FIG. 1 with the load bucket shown in phantom; and, FIG. 3 is a cutaway view of a portion of the chain of the bale saw of FIG. 1.

A pair of lower beams 38 and a pair of upper beams 40 are mounted on cross member 26 in a rearward direction for positioning below and above the bottom 14 of the tractor bucket 12, respectively. Pairs of upper beams 40 and lower beams 38 are spaced apart appropriately on both sides of the bucket 12 for slidable fit over the bottom 14. As illustrated in FIG. 2, the lower beam 38 is preferably longer than the upper beam 40, and extends to near the back 18 of tractor bucket 12.

To mount the frame 24 on tractor bucket 12, frame 24 is first slid over the edge of the bottom 14 of the tractor bucket 12 with the lower beam 38 below the bottom 14 and upper beam 40 above the bottom 14. The frame 24 is pushed onto the tractor bucket 12 until the top frame member 34 is positioned over the top 20 of the tractor bucket 12. The top frame member 34 is then attached to the top 20 by welding or by the bolt 36.

Each upper beam 40 is provided with a first point of attachment for an eyelet 42 which is mounted, preferably by welding, on a forward end of upper beam 40. Each lower beam 38 is provided with a second point of attachment for an eyelet 44 which is mounted, preferably by welding, on the rear end of lower beam 38.

Once the frame 24 has been positioned on tractor bucket 12, and bolt 36 has attached top frame member 34 to top 20, straps are used to attach first eyelet 42 to second eyelet 44, such as by a come-along system. In FIG. 1, the straps illustrated are cable winches 46. The cable is attached to eyelet 42 extended up the front of the tractor bucket 12, over top 20, and down behind back 18 to attach to the second eyelet 44. The two cable winches 46 securely hold frame 24 to tractor bucket 12, and are quickly releasable for quick removal of frame 24. Other strap structures, such as chains or web straps, may be selected and used by those skilled in the art.

A pair of diagonal supports 37 is mounted on either side of forward vertical standards 28. Diagonal supports 37 are welded to the cross member 26 and to the forward vertical standards 28 to reinforce the frame 24 and maintain the forward vertical standards 28 in the vertical position.

Figure 3:
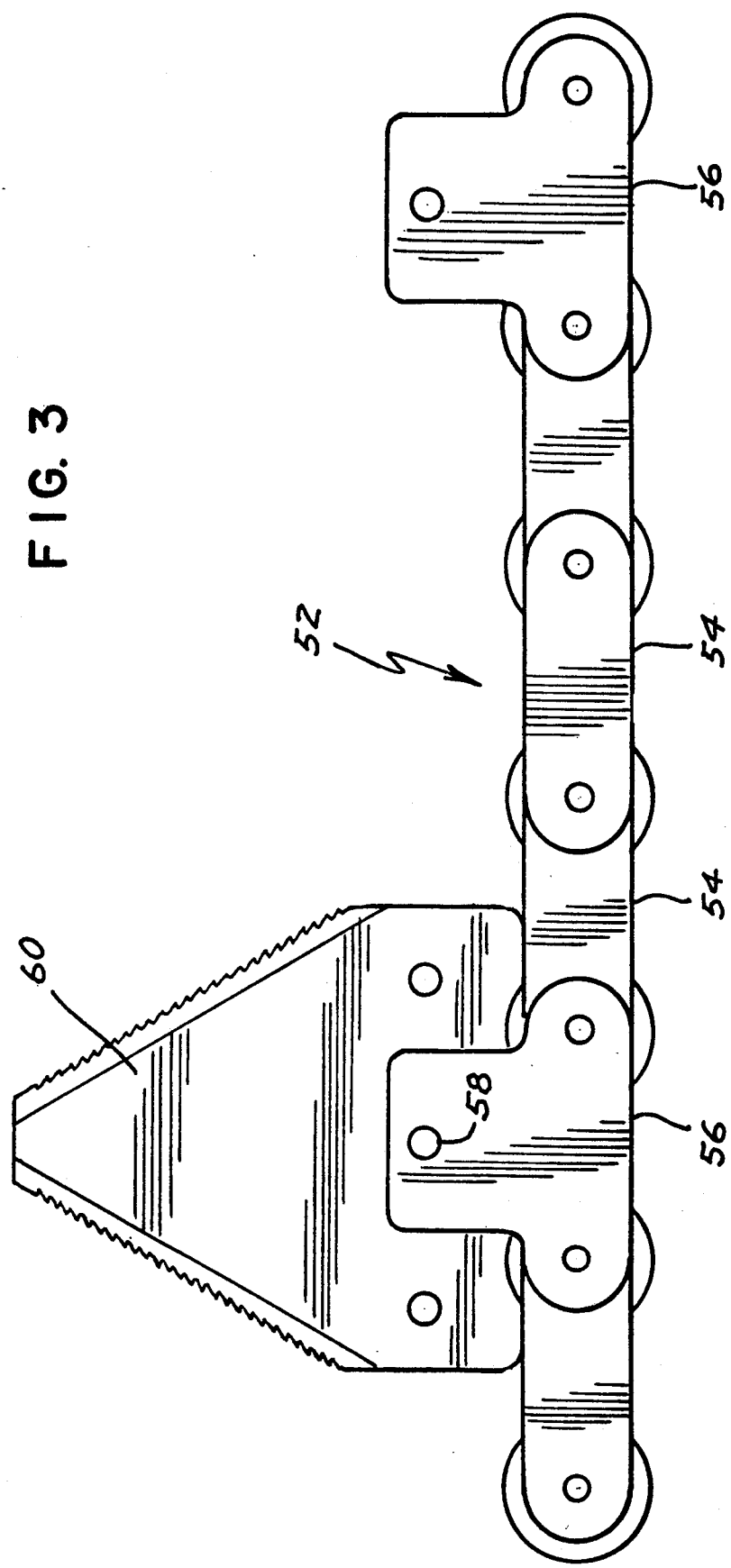

A bale saw bar 50 is mounted to a superstructure, which includes forward vertical standards 28 and rear vertical standards 30, preferably by welding. A continuous cutting chain 52 is mounted for movement in a generally and substantially oval path around the bale saw bar 50 as is shown in the prior art. A section of the chain 52 is illustrated in FIG. 3. Normal links 54 of chain 52 are illustrated mixed with cutting tooth links 56. Tooth links 56 have apertures 58 for mounting teeth 60 by bolts. In the preferred embodiment, ¼" mounting bolts are used. The tooth links 56 are preferably approximately 9" apart. These dimensions are by way of example and for purposes of illustration only, and not to be construed as limiting of the present invention.

A chain 52 is driven by a hydraulic motor 62 which is powered by a hydraulic connection 64 from normal tractor power or vehicle power. A motor 62 is mounted on the top frame member 34. A drive chain 66 is mounted on a sprocket 68 of the motor 62, a sprocket 70 mounted on the frame 24, and a sprocket 72 mounted on the bale saw bar 50. A drive chain 66 transmits the rotational energy from the sprocket 68 to the sprocket 72 to rotate the chain 52.

FIG. 1 also shows claws or forks of a hydraulically actuated gripper for securing a bale of hay during movement about the pasture.

MODE OF OPERATION

The frame 24 may easily be mounted on tractor bucket 12 by driving a tractor carrying a bucket 12 so that the bottom 14 slides into frame 10 between upper beams 40 and lower beams 38, and the edge engages against the member 26. The top frame member 34 is then welded or bolted to top 20 of tractor bucket 12. Strap structures, like the cable winch 46, are then strapped around tractor bucket 12 to secure the frame 24 to the bucket.

The tractor operator then drives the tractor up to a bale and cross-cuts the bale into manageable sections. By raising and lowering the tractor bucket 12, the chain 52 can cut bales at any height and at any width. The chain 52 can cut bales from either the bottom or the top, depending on their position. For example, the rotating chain 52 may be lowered onto the top of the bale to slice the bale. The tractor may be moved to vary the slicing position. In the preferred embodiment, the chain speed is variable, for example from 1,000 feet per minute to 2,000 feet per minute by way of example and for purposes of illustration only and not to be construed as limiting of the present invention.

The present invention provides a tool for allowing easier manipulation of large, round hay bales by a farmer. Instead of requiring specialized grinding equipment, this easily transportable bale saw cuts the bales into manageable sizes for treatment with other prior art equipment or even eating by the animals at the area of cutting.

Various modifications can be made to the present invention without departing from the apparent scope hereof.

I claim:

1. A bale saw for cutting hay bales attachable to a tractor load bucket of the type having a horizontal bottom with a front cutting edge, two side walls, a back wall and a top, the bale saw including a frame for mounting on the load bucket, the frame comprising:
   a. a horizontal cross member;
   b. at least one lower bucket beam mounted on the cross member and extending in a direction transverse to the cross member for slidable mounting below the bucket bottom;
   c. at least one upper bucket beam mounted on the cross member spaced apart vertically from the lower bucket beam and extending in the same direction as the lower bucket beam for slidable mounting over the bucket bottom;
   d. a generally vertically mounted frame superstructure mounted on the cross member;
   e. a top beam mounted on the frame superstructure and extending generally parallel to and in the same direction as the upper and lower bucket beams for removable attachment to the bucket top;
   f. the bale saw further including strap means attached at two places on the frame and having sufficient length to extend around the bucket for removably securing the frame to the bucket;
   g. a bale saw bar mounted on the superstructure and extending in a direction opposite the direction of the top beam and the bucket beams;
   h. a bale saw chain mounted on the bale saw bar for movement along the bar; and,
   i. a motor mounted on the frame operatively connected to the chain for moving the chain.

* * * * *